United States Patent

[11] 3,599,608

| [72] | Inventor | Raymond D. Esquival<br>11546 Rochester, Apt. #3, Los Angeles,<br>Calif. 90025 |
|---|---|---|
| [21] | Appl. No. | 863,798 |
| [22] | Filed | Oct. 6, 1969 |
| [45] | Patented | Aug. 17, 1971 |

[54] AUTOMATIC PET FEEDER
8 Claims, 5 Drawing Figs.

| [52] | U.S. Cl. | 119/51.12 |
|---|---|---|
| [51] | Int. Cl. | A01k 5/00 |
| [50] | Field of Search | 119/51.12, 51.11, 51.14, 51.5, 56 |

[56] References Cited
UNITED STATES PATENTS

| 1,022,309 | 4/1912 | Elliott | 119/51.12 |
| 2,528,742 | 11/1950 | Coffing | 119/51.12 |
| 3,180,316 | 4/1965 | Chatfield et al. | 119/51.12 |
| 3,330,256 | 7/1967 | De Vaux | 119/51.12 |

FOREIGN PATENTS

| 505,902 | 5/1939 | Great Britain | 119/51.12 |

*Primary Examiner*—Hugh R. Chamblee
*Attorney*—Lynn H. Latta

ABSTRACT: A container in which a dish of pet food can be placed, has a cover which can be manually closed to prevent access to the food until feeding time, when a time clock using household current 115 v. AC releases a latch holding the cover in closed position, whereupon a spring will retract the cover to give access to the food, and a limit switch will be opened by the cover to inactivate the latch-releasing circuit.

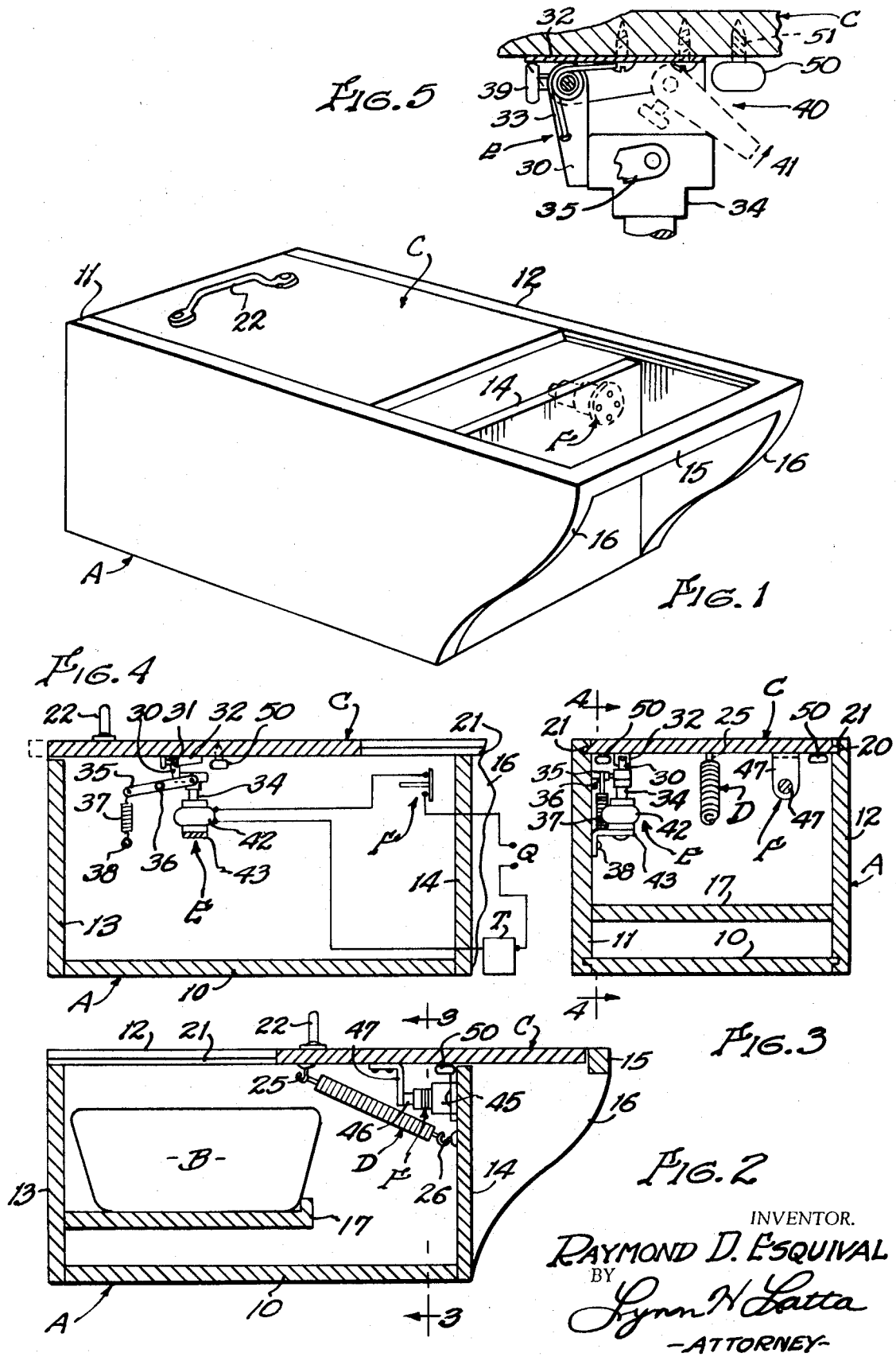

AUTOMATIC PET FEEDER

BACKGROUND OF THE INVENTION

Automatic pet feeders, broadly, are old in the art as represented by the following prior patents which are the closest, within my knowledge, to the present invention:

| | | |
|---|---|---|
| Chatfield— | 3,180,316 | Different construction |
| Sweeny— | 2,157,682 | Expired |
| Elliott— | 1,022,309 | Expired |

SUMMARY OF THE INVENTION

The present invention provides a feeder which is improved over such prior art in that it embodies a simple and inexpensive construction wherein the container is in the form of a rectangular box with a cover horizontally slidable along the upper margins of the parallel sides of the box, a solenoid-operated latch, spring-loaded for automatic latching, becoming operative automatically upon closing the cover, to hold the cover in a position preventing access to the food dish, a time clock being operative to trigger the operation of the solenoid to release the latch at feeding time, and a limit switch, normally closed to form a part of the latch-releasing circuit when the cover is closed, being opened by retraction of the cover so as to render the latch-releasing solenoid inoperative until a succeeding manual operation of closing the cover over a refilled food dish, thus preventing useless operation of the solenoid in instances where the feeder may be left unused for a period of time (e.g. during a vacation absence) and yet inadvertently left connected to a power circuit which continues to cycle the time clock.

The general object of the invention is to provide a pet feeder which is relatively simple and inexpensive in construction while embodying dependable and foolproof features such as those described above. Other objects will become apparent in the following specifications and appended drawing, wherein:

FIG. 1 is a perspective view of a pet feeder embodying the invention;

FIG. 2 is a longitudinal vertical sectional view thereof;

FIG. 3 is a transverse sectional view thereof, taken on line 3–3 of FIG. 2;

FIG. 4 is a fragmentary longitudinal sectional view thereof, showing only the parts immediately adjacent the plane indicated by line 4–4 of FIG. 3; and FIG. 5 is a detail sectional view of the cover latch unit.

DESCRIPTION

Referring now to the drawing in detail, I have shown therein, as an example of one form in which the invention may be embodied, an automatic pet feeder comprising a housing A adapted to contain a feed dish B, a slidable cover C for covering the dish B, a spring D loading the cover for movement toward an open position (FIG. 2) in which dish B is uncovered so that a pet may have access to the food therein; a time clock T (FIG 4) operable to close a circuit to the solenoid of latch E at a time set thereon; and a limit switch F for opening such circuit to remove the electric current from the time clock and prevent its being again operative until the cover C has been reset to closed position.

In detail, housing A comprises a bottom 10, sidewalls 11 and 12, front and rear end walls 13 and 14, a handle 15 (for portability) carried between extensions 16 of sidewalls 11 and 12, and a dish platform 17 secured between sidewalls 11 and 12 above bottom 10, to support dish B at an accessible height.

Cover C has its two lateral margins provided with lips 20 which are slidably mounted in ways 21 in the inner sides of sidewalls 11, 12 near their upper margins. When in open position it abuts handle 15 (FIG. 2) which protects the pet from injury caused by the opening movement of the cover, and then an opening is defined between its forward end and forward housing wall 13, above dish B, providing access to the food in dish B. Cover C has a handle 22 for closing it.

Spring D is secured at 25 to cover C and at 26 to rear end wall 14. It is tensioned to draw the cover to its open position when the cover is released.

Latch unit E (FIG. 5) comprises a latch pawl 30 mounted to cover C on a pivot 31 carried by a bracket 32 secured to the underside of cover C, loaded by a mousetrap type spring 33 for swinging movement from a raised, retracted position to the downwardly projected position shown in full lines in FIG. 5. In this position it is engageable behind the head of a solenoid plunger 34 which is normally maintained in the upwardly projected position shown, by a lever 35 fulcrumed at its center on a pivot 36 mounted to housing wall 11, having one end pivoted to plunger 34 in lifting relation thereto, and its other end loaded by a tension spring 37 which yieldingly exerts the lifting action, spring 37 being anchored at 38 to housing wall 11.

The slideways 21 are open at their forward ends and the upper margin of front wall 13 is disposed below the plane of the underside of cover C, whereby the cover may overtravel its closed position and project beyond the front wall 13 in order to allow the latch pawl 30 to clear the head of solenoid plunger 34 and drop into latching position ahead of plunger 34 as indicated in broken lines in FIG. 4.

Latch pawl 30 has a stop (e.g. screw) 39 which projects at right angles thereto from its pivoted end, to engage beneath cover C to dispose the pawl in its downwardly projecting position in which it is yieldingly held by spring 33 except when the cover is being manually moved to its closed position as indicated by arrow 40 in FIG. 5. During such closing movement the latch pawl 30 will ride over the head of plunger 34, pivoting upwardly as indicated by arrow 41, and when its free end clears the plunger head it will drop before the head under the urging of spring 33, thereby latching the cover in the closed position.

A solenoid 42, when energized is operable on its plunger 34 to draw it downwardly until its head is cleared by the lower end of latch pawl 30, whereby the cover is released for closing under the pull of spring D. Solenoid 42 is mounted to housing wall 11 by suitable means such as a bracket 43.

Timer T may be external to housing A in a suitable location, and provides a circuit-making connection in a solenoid-energizing circuit 44, including the circuit-closing contacts of the timer, the solenoid 42, and the limit switch F in series with a current source Q. The timer T may be a clock timer or commercial clock radio or may embody an electric motor (not shown) and in the latter event, an additional circuit to the timer motor from source Q or from any other suitable source, will be included.

Limit switch F includes a casing 45 mounted on rear wall 14 and a plunger or button 46 positioned for engagement thereof by an actuator projection 47 secured to the underside of the cover C when the cover is drawn to its open position. The switch F is normally closed, and is opened when plunger 46 is thus engaged. Thus when the cover is manually closed and latched in the closed position, the limit switch will set up the solenoid circuit to be completed by the timer T when feeding time arrives.

Mounted to the underside of cover C at the respective sides thereof, are bumpers consisting of rubber grommets 50 mounted on screws 51 fastened in the cover in positions such that engagement of the bumpers against rear wall 14 will dispose the cover in its open position, arresting the opening movement with a cushioning action.

The operation of the feeder will be largely apparent from the foregoing. A pet's meal may be placed in dish B and then concealed in the feeder by placing the dish on platform 17 (after inserting it through the opening defined by the retracted cover) and the cover may then be closed manually by drawing it to he closed position of FIG. 4. Latch E will be automatically retracted by riding over plunger 34, and will then spring into latching position in engagement with the plunger head. The feeder will then hold the meal, preventing access to it, until timer T closes the solenoid circuit at feeding time. The solenoid will retract the latch, the cover will be retracted by spring D, and the meal will thus be exposed for feeding by the pet.

I claim:
1. In a pet feeder:
 a housing having laterally spaced sides providing parallel slide means along their upper margins, said housing providing near one end thereof a compartment to receive a quantity of pet food;
 a cover slidably engaged with said slide means for movement from a position substantially closing said compartment so as to prevent access to said food, to an open position providing access to said food;
 latch means automatically operable upon closing of the cover to latch the cover to said housing in the said closed position;
 a timer operable to determine a feeding time for the pet;
 electrically operated means, controlled by said timer for releasing said latch at said feeding time;
 and spring means loading said cover for movement to said open position upon release of said latch;
 said housing sides having parallel upper margins and said slide means comprising ways in the form of internal grooves in said sides along said upper margins, and longitudinal lips on the side margins of said cover, slidably engaged in said ways;
 said latch comprising a spring-loaded pawl pivoted to the underside of said cover on a transverse axis for pivotal movement between a downwardly projecting position and a raised, retracted position;
 means to limit the spring-urged movement of said pawl at said downwardly projecting position;
 and a solenoid including a plunger normally disposed in a raised position engageable with said pawl to latch the cover in the close position, said solenoid, when energized being operable to withdraw and said plunger downwardly to a retracted position releasing said pawl to permit automatic spring-urged movement of said cover to its open position;
 said pawl and plunger being relatively positioned so that said pawl will yield upwardly and ride over said plunger in the raised position thereof, so as to drop into latching position ahead of said plunger.
2. A feeder as defined in claim 1, wherein said ways are open at the forward end of said housing, including said forward end a front wall having an upper margin positioned below the plane of the under face of said cover, whereby said cover may overtravel its closed position, projecting beyond said front wall, to allow said latch pawl to clear said plunger head from dropping into its latching position.

3. A feeder as defined in claim 1, including a spring-loaded lever pivoted to a sidewall of said housing and linked to said plunger to yieldingly maintain it in its raised position.
4. In a pet feeder:
 a housing having laterally spaced sides providing parallel slide means along their upper margins, said housing providing near one end thereof a compartment to receive a quantity of pet food;
 a cover slidably engaged with said slide means for movement from a position substantially closing said compartment so as to prevent access to said food, to an open position providing access to said food;
 latch means automatically operable upon closing of he cover to latch the cover to said housing in the said closed position;
 a timer operable to determine a feeding time for the pet;
 electrically operated means, controlled by said timer for releasing said latch at said feeding time;
 and spring means loading said cover for movement to said open position upon release of said latch;
 said housing sides having parallel upper margins and said slide means comprising ways in the form of internal grooves in said sides along said upper margins, and longitudinal lips on the side margins of said cover, slidably engaged in said ways;
 said electrically operated means including in its operating circuit a normally closed limit switch in said housing, and a switch actuator carried by said cover and engageable with said limit switch when the cover is in its open position, to open said operating circuit and thereby render the timer inoperative until he cover is reset to a closed position.
5. A feeder as defined in claim 4;
 said housing including a rear end wall and said sides including portions projecting beyond said rear end wall;
 and a handle secured to and extending transversely between said projecting sidewall portions at a level such as to protect a pet from being struck by the rear end of said cover during its spring-propelled movement to its open position.
6. A feeder as defined in claim 5, wherein said handle is disposed in the plane of said cover, adjacent the rear end of the cover in the open position thereof.
7. A feeder as defined in claim 6, including bumper means carried by the cover on its underside and engageable with said rear end wall adjacent its upper margin to arrest the opening movement of the cover at its open position with a cushioning action.
8. A feeder as defined in claim 4, including bumper means operable between the cover and said housing to arrest the opening movement of the cover at its open position with a cushioning action.